(12) United States Patent
Franchville et al.

(10) Patent No.: US 6,278,485 B1
(45) Date of Patent: Aug. 21, 2001

(54) PRECONFIGURED CATV SWEEP TESTING METHOD AND APPARATUS

(75) Inventors: Douglas J. Franchville; Andrew E. Bowyer, both of Indianapolis, IN (US)

(73) Assignee: Wavetek Corporation, Indianapolis, IN (US)

( * ) Notice: Subject to any disclaimer, the term of this patent is extended or adjusted under 35 U.S.C. 154(b) by 0 days.

(21) Appl. No.: 08/980,959

(22) Filed: Dec. 1, 1997

(51) Int. Cl.[7] .......................... H04N 17/00; G01R 23/00; G01R 13/20; H04B 17/00
(52) U.S. Cl. .......................... 348/192; 348/192; 348/193; 348/180; 348/189; 324/76.19; 324/76.26; 324/76.22; 324/76.23; 455/67.4
(58) Field of Search .................................. 348/6, 12, 13, 348/192, 193, 180–191; 455/3.1, 5.1, 6.1, 67.1, 67.4; 324/620, 76.19, 76.2, 76.21, 76.22–76.23, 76.24, 76.25, 76.26, 76.27

(56) References Cited

U.S. PATENT DOCUMENTS

| | | | |
|---|---|---|---|
| 3,651,403 | 3/1972 | Fluck, Jr. | 325/31 |
| 3,978,282 | 8/1976 | Fulton, Jr. | 178/69 |
| 4,207,431 | * 6/1980 | McVoy | 179/1 |
| 4,408,227 | 10/1983 | Bradley | 358/139 |
| 4,700,222 | 10/1987 | Large et al. | 358/86 |
| 5,073,822 | * 12/1991 | Gumm et al. | 358/139 |
| 5,233,418 | * 8/1993 | Gumm et al. | 358/139 |
| 5,463,317 | * 10/1995 | Murphy | 324/520 |
| 5,473,361 | 12/1995 | Penney | 348/6 |
| 5,493,209 | * 2/1996 | Gumm et al. | 324/76.23 |
| 5,585,842 | * 12/1996 | Chappell et al. | 348/192 |
| 5,867,206 | * 2/1999 | Voght et al. | 348/6 |
| 6,160,991 | * 12/2000 | Chappell et al. | 455/6.2 |

* cited by examiner

Primary Examiner—Reinhard J. Eisenzopf
Assistant Examiner—Paulos Natnael
(74) Attorney, Agent, or Firm—Maginot, Addison & Moore

(57) ABSTRACT

An exemplary embodiment of the present invention is an apparatus for receiving sweep testing signals and generating frequency response values therefrom. The apparatus includes a test input, a controller, a receiver circuit and a measurement circuit. The test input has a first connection arrangement for connecting to a test output of the sweep transmitter and also has a second connection arrangement for connecting to a terminal of the communication system to be tested. The controller is operable to generate a sweep control signal responsive to a sweep plan. The receiver circuit has a control input connected to receive the sweep control signal from the controller, and is operable to tune to a plurality of frequencies responsive to the sweep control signal. The measurement circuit is coupled to the receiver circuit and is operable to generate measurement signals corresponding to the plurality of frequencies. In accordance with the present invention, the controller is further operable to: receive a first set of measurement signals from the measurement circuit when said test input is connected in the first connection arrangement; receive a second set of measurement signals from the measurement circuit when said test input is connected in the second connection arrangement; and generate a frequency response based on the first set of measurement signals and the second set of measurement signals.

29 Claims, 7 Drawing Sheets

PRECONFIGURED CATV SWEEP TESTING METHOD AND APPARATUS

FIELD OF THE INVENTION

The present invention relates generally to communication system testing, and more particularly, to frequency sweep testing of communication systems.

BACKGROUND OF THE INVENTION

Cable television distribution networks, or CATV distribution networks, have historically been used to provide a plurality of television signals from a centralized transmitter to a distributed network of subscribers. Such use typically required only one-way communication, from the centralized transmitter to the subscribers. Recently, however CATV distribution networks have been increasingly employed for two-way communication to facilitate the provision of new services. CATV distribution networks are desirable for use as two-way communication links because of the bandwidth that is available in the distribution network. CATV distribution networks can support high speed data links that may be used for computer internetworking, home banking, and even telephony.

All communications, including communications over CATV networks, require a high quality transmission network. Accordingly, CATV service providers closely monitor the operation of the CATV distribution network to ensure that subscribers receive appropriate signal levels. To ensure quality two-way communications CATV service providers also perform tests to monitor the quality of reverse path transmissions, in other words, transmissions from the subscribers to a centralized receiver. Unfortunately, most of the problems associated with reverse path transmissions originate within devices and components owned and maintained by CATV subscribers.

In particular, CATV subscribers typically own and maintain the distribution network, or subscriber network, located within their own dwellings. Accordingly, the component quality and condition can vary widely. Moreover, CATV subscribers often install one-way amplifiers and other components that are not intended for two-way communications. While such components may provide adequate signal levels for receiving television signals, such components are often inadequate for two-way communication applications.

Accordingly, with the advent of two-way communications using the CATV distribution network, a need has arisen for testing the signal response of subscriber networks to ensure high quality reverse path transmissions. One effective method of testing the signal response of a network such as a subscriber network is a test known as a frequency sweep test, or simply sweep test. A sweep test is a test in which a transmitter is connected to a first end of a system under test and transmits a signal having a swept frequency over a predetermined frequency range. A receiver that is synchronized with the transmitter then is connected at a second end of the system under test and receives the signal and analyzes the received signal strength at each of the swept frequencies. The analysis provides the frequency response of the system under test.

CATV service providers have historically used sweep testing to test the forward path signal quality of the CATV distribution network. Several sweep testing systems are known. These systems, such as the one disclosed in U.S. Pat. No. 5,585,842, are primarily intended for a configuration in which the sweep transmitter is installed at the CATV centralized transmitter, and the sweep receiver is installed at a remote test site. Typically, the sweep receiver will be moved from test site to test site while the transmitter is installed at the CATV centralized transmitter.

One consequence of the above described configuration is that the sweep transmitter must communicate with the sweep receiver to coordinate sweep plan information and normalization measurement information. Sweep plan information is information that identifies the frequencies to be swept, which can vary from test to test. Normalization measurement information is information identifying the strength of the transmitted sweep signal, which can vary from test to test, particularly over long periods between tests.

U.S. Pat. No. 5,585,842 teaches the communication of the sweep plan information and normalization measurement information by transmitting a telemetry signal over the CATV network to the sweep receiver. The telemetry signal is a baseband data signal modulated onto an RF carrier signal. The baseband data signal comprises data representative of the sweep plan and the normalization measurements. The sweep receiver then uses the sweep frequency information in the telemetry signal to identify the frequencies to be swept, and uses the measurement information to identify the strength of the transmitted signal. To transmit telemetry signals over the CATV network, the sweep transmitter includes circuitry for modulating a digital information signal onto an RF carrier signal.

Sweep systems of such design are quite adequate for use in configurations in which the sweep transmitter is installed at the head end and the sweep receiver is moved from location to location, as is typical in forward path measurements. Sweep systems of such design have also been used for testing subscriber networks in the context of reverse path communications. However, such systems are not cost optimal for testing reverse path communications of subscriber networks. In particular, the telemetry signal transmission capabilities significantly impact the cost of the sweep transmission devices used in such systems. While such costs are easily justified for forward path testing, in which only one sweep transmitter is needed to test an entire network, such costs are not always justified for reverse path testing of subscriber networks, where a separate transmitter is required for each test.

In particular, to test a subscriber network in isolation, the sweep transmitter and sweep receiver must be installed at each test location. Accordingly, in contrast to forward path distribution network testing, a separate transmitter is required for each testing operation. To carry out several tests in parallel, or to allow several technicians to have the necessary equipment to carry out such tests, the CATV service provider must stock several sweep transmitters. Such an increase in the number of transmitters owned by a CATV service provider greatly increases the cost to the CATV service provider. Thus, for reverse path subscriber network sweep testing, a need has arisen for a low cost and low complexity sweep measurement system.

One way of reducing the sweep transmitter cost would be to use a single predefined sweep plan and dispense with normalization measurements, thereby eliminating the need for telemetry signals. Telemetry is necessary, however, to facilitate flexible and accurate tests. In particular, the normalization measurement information provided through telemetry signals is required for accurate signal response measurements. Without the normalization measurement information, which provides a measurement of the transmitted signals at the transmission point, operational variances of the sweep transmitter are not accounted for in the measurement thereby causing inaccuracy. In addition, without the sweep plan information, the sweep transmitter and sweep receiver must rely on a predetermined and inflexible set of frequencies to be swept.

A need therefore exists for a sweep testing system that has the accuracy provided by the use normalization measurement information identifying the strength of the sweep signal at the transmission point, or normalization information, without the need for providing RF telemetry signals. A need also exists for a sweep testing system that has the flexibility provided by a variable sweep plan without the need for providing RF telemetry signals.

SUMMARY OF THE INVENTION

The present invention fulfills the above stated needs, as well as others, by providing a sweep transmitter and sweep receiver that operate in a configuration mode and a test mode. In the configuration mode, the sweep receiver is connected to effect direct digital communications with the sweep transmitter, and is further connected to receive RF signals directly from the sweep transmitter. In the configuration mode, the sweep transmitter and sweep receiver coordinate and communicate the sweep plan. The sweep receiver further takes RF measurements that constitute the normalization measurements. In the test mode, the sweep transmitter and sweep receiver are connected to the system under test. The sweep receiver uses the sweep plan information and normalization information obtained in the configuration mode to carry out the sweep test. The two mode operation of the present invention sweep plans without the need for transmitting sweep plans as a telemetry signal. The use of stored normalized values allows for the accuracy afforded by the use of normalization information without relying on telemetry signals to communicate such values over the RF system to be tested.

An exemplary embodiment of the present invention is an apparatus for receiving sweep testing signals and generating frequency response values therefrom. In particular, the apparatus receives sweep testing signals generated in accordance with a predefined sweep plan by a remote sweep transmitter, the sweep transmitter coupled to a communication system to be tested. The apparatus includes a test input, a controller, a receiver circuit and a measurement circuit.

The test input has a first connection arrangement for connecting to a test output of the sweep transmitter and also has a second connection arrangement for connecting to a terminal of the communication system to be tested. The controller is operable to generate a sweep control signal responsive to a sweep plan. The receiver circuit has a control input connected to receive the sweep control signal from the controller. and is operable to tune to a plurality of frequencies responsive to the sweep control signal. The measurement circuit is coupled to the receiver circuit and is operable to generate measurement signals corresponding to the plurality of frequencies.

In accordance with the present invention, the controller is further operable to: receive a first set of measurement signals from the measurement circuit when said test input is connected in the first connection arrangement; receive a second set of measurement signals from the measurement circuit when said test input is connected in the second connection arrangement; and generate a frequency response based on the first set of measurement signals and the second set of measurement signals.

The above discussed features and advantages, as well as others, will become more readily apparent to those of ordinary skill in the art by reference to the following detailed description and accompanying drawings.

DETAILED DESCRIPTION

Figure 1:
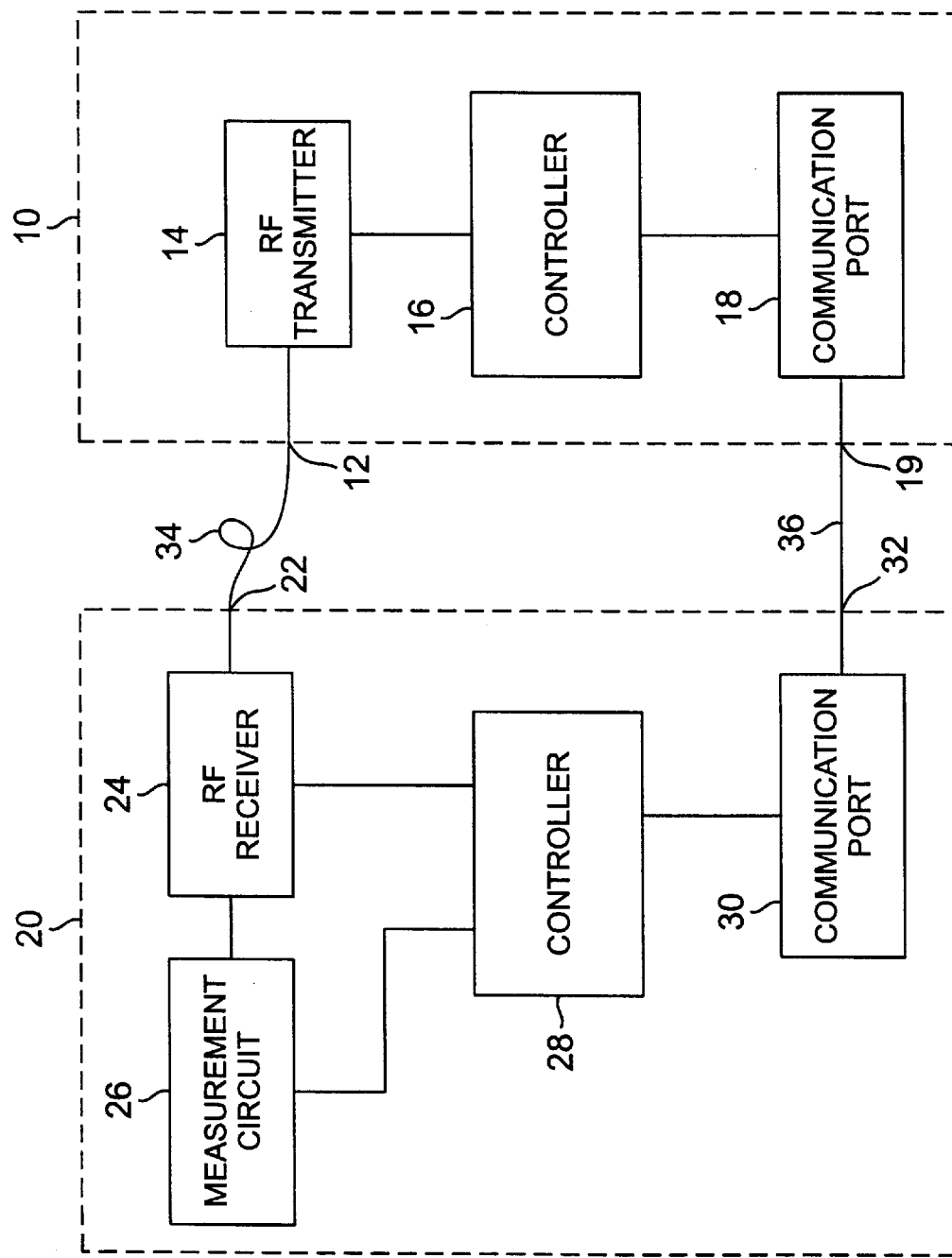
FIG. 1 shows a sweep transmitter 10 and a sweep receiver 20 according to the present invention connected in a first connection arrangement for operation in a sweep configuration mode.
Figure 2:
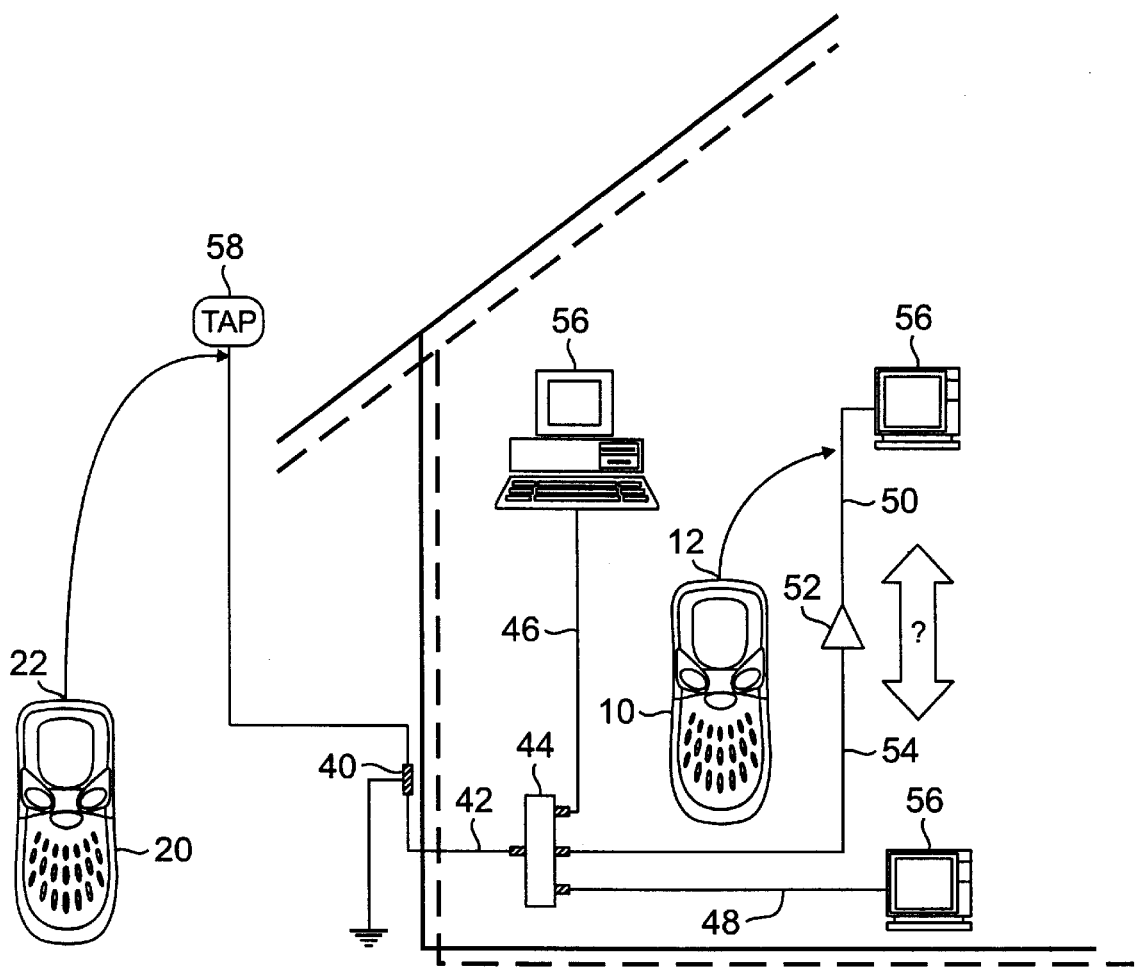
FIG. 2 shows a sweep transmitter 10 and a sweep receiver 20 in a second connection arrangement for operation in a sweep testing mode.

FIGS. 1 and 2 show a sweep transmitter 10 and a sweep receiver 20 according to the present invention connected in two modes of operation. FIG. 1 shows a sweep transmitter 10 and a sweep receiver 20 according to the present invention in a first connection arrangement for operation in a sweep configuration mode. FIG. 2 shows a sweep transmitter 10 and a sweep receiver 20 in a second connection arrangement for operation in a sweep testing mode. The second connection arrangement is an arrangement in which the sweep transmitter 10 and sweep receiver 20 are connected to a system under test. In general, prior to connection the system under test as shown in FIG. 2, the sweep transmitter 10 and sweep receiver 20 are connected as shown in FIG. 1 to communicate a sweep plan and to provide the sweep receiver 20 with normalization measurements.

Referring to FIG. 1, the sweep transmitter 10 includes an RF test output 12, an RF transmitter 14, a transmitter controller 16, and a communication port 18. The RF test output 12 is connected to the RF transmitter 14. The RF transmitter 14 is further connected to the transmitter controller 16 to receive control signals therefrom. The RF transmitter 14 is an RF circuit operable to generate RF signals including a sweep signal, wherein the sweep signal is an RF test signal in which the frequency of the RF test signal is swept over time over a predetermined frequency range. The RF transmitter 14 is furthermore operable to generate the sweep signal in accordance with a sweep control signal received from the transmitter controller 16.

The RF transmitter 14 is further operable to, responsive to control signals from the transmitter controller 16, generate a synchronization signal which has a predetermined time delay relationship with the sweep signal. In the exemplary embodiment described herein, the RF transmitter 14 is operable to generate a synchronization signal at a predetermined time delay relationship with respect to the generation of the sweep signal.

The transmitter controller 16 is a processor circuit that is operable to generate a sweep control signal that corresponds to the frequencies to be swept. In the exemplary embodiment described herein, the transmitter controller 16 is operable to generate a sweep control signal that identifies a sweep range and a sweep resolution.

Thus, for example, if the controller 16 provided a sweep control signal to the transmitter 14 identifying a sweep range of 5 MHz to 600.2 MHz and a sweep resolution of 129, then the transmitter 14 would generate a sweep signal that first transmits a test signal at 5 MHz, then transmits a test signal at 9.65 MHz, then transmits a test signal at 14.3 MHz, and so forth, until 600.2 MHz is reached.

The transmitter controller 16 is further operable to generate a synchronization control signal including a synchronization pulse sequence at a predetermined time delay relationship with the sweep control signal.

The transmitter controller 16 is further connected to the communication port 18. The communication port 18 is a digital communication circuit that is operable to provide a communication interface between the controller 16 and the auxiliary output 19. The communication port 18 in the exemplary embodiment described herein comprises a three-wire (transmit, receive, and ground) communication circuit that implements a simplified RS-232 protocol.

The sweep receiver 20 comprises an RF test input 22, an RF receiver 24, a measurement circuit 525, a receiver controller 28, a communication port 30, and an auxiliary input 32. The RF test input 22 is coupled to the RF receiver 24. The RF receiver 24 is further coupled to the measurement circuit 26 and the controller 28. The RF receiver circuit is a circuit operable to receive a sweep signal of the type transmitted by the RF transmitter 14.

In particular, the RF receiver 24 is a circuit operable to receive from the RF input 22 a sweep signal comprising an RF test signal in which the frequency of the RF test signal is swept over a predetermined frequency range. To this end, the RF controller 28 selectively tunes in a time sequential manner to a plurality of frequencies responsive to a sweep control signal received from the receiver controller 28. The RF receiver 24 is operable to provide a substantially constant frequency intermediate sweep signal having a plurality of temporally adjacent segments, each of which corresponds to one of the swept frequencies.

For example, if the sweep signal is an RF test signal swept in 4.65 MHz increments between 5 MHz and 600.2 MHz, then the intermediate sweep signal includes a first segment corresponding to 5 MHz, a second segment corresponding to 9.65 MHz, a third segment corresponding to 14.3 MHz, and so forth.

The RF receiver 24 is further operable to receive synchronization signals at a select RF frequency and provide intermediate frequency synchronization signals to the measurement circuit 26.

The measurement circuit 26 is operable to generate a signal level corresponding to a received signal, for example, for each intermediate sweep signal segment and the intermediate frequency synchronization signal. Such sweep measurement circuits are known in the art. Further detail regarding a suitable measurement circuit is described below in connection with FIG. 5.

The receiver controller 28 is a circuit operable to receive measurement information pertaining and identify a synchronization sequence therefrom. The receiver controller is further operable to generate a sweep control signal at a predetermined time delay from the detection of a synchronization sequence. The sweep control signal contains information that corresponds to the sweep plan.

The receiver controller 28 is further connected to a communication port 30. The communication port 30 is a device operable to effect communications with the communication port 18 of the sweep transmitter 10. Preferably, the communication port 30 and communication port 18 are operable to effectuate direct communication with each other. Direct communication as defined herein means communication without the intervention of an external communication network. Direct communication between the communication port 18 and communication port 30 may be accomplished, by way of example, by one or more wires, a coaxial cable, or through a direct RF transmission. Communication through the telephone network, or CATV distribution network, is not considered to be direct communication.

It is furthermore preferable that the communication port 30 and the communication port 18 be operable to communicate baseband digital signals, thereby eliminating the need for signal modulation equipment.

As shown in FIG. 1, the sweep transmitter 10 is connected to the sweep receiver 20 in the configuration mode through an RF test cable 34 and a digital connection cable 36. Specifically, the RF test cable 34 directly connects the RF test output of 12 the sweep transmitter 10 to the RF input 22 of the sweep receiver 20, and the digital connection cable 36 directly connects the auxiliary input 19 of the sweep transmitter 10 to the auxiliary input 32 of the sweep receiver 20.

In general, the sweep transmitter 10 and the sweep receiver 20 operate in the configuration mode to establish test parameters for a sweep test of a system to be tested. In particular, the receiver controller 28 obtains a sweep plan from a memory associated therewith, not shown. The sweep plan contains information that identifies the frequencies to be swept. In the exemplary embodiment described herein, the sweep plan identifies the sweep range and the sweep resolution. The sweep range identifies the range of frequencies swept, for example, 5 MHz to 600 MHz. The sweep resolution identifies the number of discrete frequencies within the range to which the sweep signal will be set, for example 129. The sweep plan may suitably be entered into the memory of the receiver controller 28 through a user input device, not shown, or through the communication port 30 from a programming device, not shown.

The receiver controller 28 then communicates digital signals representative of the sweep plan to the transmitter controller 16 through the communication port 30, the auxiliary input 32, the digital connection cable 36, the auxiliary input 19, and the communication port 18.

The transmitter controller 16 then receives the digital signals representative of the sweep plan from the communication port 18, and generates a sweep control signal therefrom. Before generating the sweep control signal however, the transmitter controller 16 generates a synchronization control signal that is provided to the RF transmitter 14. The RF transmitter 14 generates and transmits a synchronization signal responsive to the synchronization control signal. The transmitter controller 16 then provides, after a predetermined delay, the sweep control signal to the RF transmitter 14. The RF transmitter 14 generates a sweep signal responsive to the sweep control signal. To this end, the sweep control signal is a signal that causes the RF transmitter 14 to transmit an RF signal having a swept frequency in accordance with the sweep plan. As a result of the predetermined time relationship between the synchronization control signal and the sweep control signal, the RF transmitter 14 generates the sweep signal after a predetermined time delay after transmission of the synchronization signal.

According to the embodiment described herein, the sequence of the synchronization signal and sweep signal is repeatedly generated and transmitted by the RF transmitter 14. The generated synchronization and sweep signals propagate through the RF test input 12, through the RF test cable 34, through the RF test input 22, to the RF receiver 24.

The RF receiver 24, responsive to control signals from the receiver controller 28, tunes to the synchronization frequency. The RF receiver 24 receives a synchronization signal and provides an intermediate frequency synchronization signal to the measurement circuit 26. The measurement circuit 26 processes the intermediate frequency synchronization signal and provides a measurement signal to the receiver controller 28 that is representative of the synchronization sequence. The receiver controller 28 then provides a sweep control signal to the RF receiver 24 after a predetermined duration from the receipt of the synchronization sequence measurement signal from the measurement circuit 26. Accordingly, the receiver controller 28 generates a sweep control signal in time synchronization with generation of the sweep control signal by the transmitter controller 16.

The RF receiver 24, responsive to the sweep control signal, tunes to the plurality of frequencies to be swept, thereby receiving the RF test signal segments transmitted by the RF transmitter 14. The RF receiver 24 then provides an intermediate signal to the measurement circuit 26. The intermediate signal is typically an IF signal having an amplitude indicative of the received sweep signal strength. In particular, the IF signal has plurality of temporally-spaced segments, each of which correspond to one of the swept frequencies of the sweep signal. More particularly, each of the segments has an amplitude indicative of the strength of a portion of the sweep signal when the sweep signal is at a particular frequency.

The measurement circuit 26 generates a measurement signal for each received intermediate signal segment. Each measurement signal identifies the strength of the sweep signal at one of the plurality of swept frequencies. The measurement signals are then provided to the receiver controller 28 where they are stored. The measurement signals represent the normalization measurements. In particular, the normalization measurements contain information indicative of the strength of the signal transmitted by the sweep transmitter 10. Because the RF test output 12 is connected directly to the RF test input 22, the measurement signals in the configuration mode of FIG. 1 provide a true normalization measurement or nominal value that serves as a benchmark for testing the frequency response of the system under test, as will be discussed below. It should be noted that the RF test cable 34 should be chosen such that it provides little or no attenuation or distortion to ensure the validity of the normalization measurements. To this end, a short length of coaxial cable may be employed as the RF test cable 34.

FIG. 2 shows the sweep transmitter 10 and the sweep receiver 20 connected in a test configuration to a system under test. The exemplary system under test is a subscriber network, in other words, a network associated with a CATV subscriber's residence, that includes a cable drop 40, a primary cable 42, a splitter 44, a first terminal cable 46, a second terminal cable 48, a third terminal cable 50, and amplifier 52 and an intermediate cable 54. It shall be noted that the subscriber network of FIG. 2 is given by way of example only. The sweep transmitter 10 and the sweep receiver 20 of the present invention may readily be used in subscriber networks of any configuration, as well as non-subscriber CATV networks.

The primary cable 42, which may suitably be coaxial cable, connects the drop 40 to the splitter 44. The splitter 44 is connected to provides RF signals received from the primary cable to each of the first terminal cable 46, the second terminal cable 48 and the intermediate cable 54. The first terminal cable 46, the second terminal cable 48 and the third terminal cable are further connected to one a plurality of terminal apparatus 56. The terminal apparatus 56 may include one or more television receivers, a personal computing system, or any other device receiving or transmitting information through the subscriber network. The amplifier 52 is coupled between the third terminal cable 50 and the intermediate cable 54 to provide boost to signals received by one of the terminal apparatus. The drop 40 connects the primary cable to a tap 58 into the CATV distribution network, not shown.

In normal operation of the subscriber network, CATV signals generated by the CATV service provider propagate from the tap 58 to the drop 40. The CATV signals then propagate through the primary cable 42 to the splitter 44. The splitter 44 provides the CATV signals to each of the first terminal cable 46, the second terminal cable 48 and the intermediate cable 54. The first terminal cable 46 and second terminal cable 48 provide the CATV signals to the terminal devices 56, and the intermediate cable 54 provides the CATV signals to another terminal device 56 through the amplifier 52 and third terminal cable 50.

In reverse path transmissions, one the terminal devices generates an RF signal which propagates in a reverse path to the tap 58. Reverse path transmissions may be employed for expanded services provided through the CATV distribution network.

To test the frequency response of the subscriber network, the sweep transmitter 10 is connected to one end of the subscriber network and the sweep receiver 20 is connected to another end of the subscriber network. FIG. 2 shows the sweep transmitter 10 and sweep receiver 20 in an exemplary configuration to test reverse path communications from the third terminal cable 50 to the tap 58. Specifically, the sweep transmitter 10 is connected via the RF input 12 to the third terminal cable 50. It will be noted that for subsequent tests, the sweep transmitter 10 may be connected to either or both of the first and second terminal cables 46 and 48, respectively. In any event, the sweep receiver 20 is connected via the RF input 22 to the tap 58.

The sweep transmitter 10 then transmits a synchronization signal such as that described above in connection with FIG. 1. The synchronization signal propagates through the third terminal cable 50, through the amplifier 52, to the intermediate cable 54. The synchronization signal continues to propagate from the intermediate cable 54 through the splitter 44 and the primary cable 42 to the tap 58. The sweep receiver 20 receives the synchronization signal at the tap 58.

In the same manner as discussed above in connection with FIG. 1, the sweep transmitter 10 generates a sweep signal a predetermined time interval after transmission of the synchronization signal. The sweep signal propagates through the same path to the sweep receiver 20, namely through the third terminal cable 50, the amplifier 52, the intermediate cable 54, the splitter 44, the primary cable 42, the cable drop 40 and the tap 58.

Contemporaneously, the sweep receiver 20 first tunes to the synchronization frequency and awaits reception of the synchronization signal. To this end, the components of the sweep receiver 20 operate in the manner analogous to that described above in connection with the reception of normalization measurements. Once the synchronization signal is detected, the sweep receiver 20 tunes to the plurality of signals to be swept in synchronization with the transmission of the sweep signal by the sweep transmitter 10.

The sweep receiver 20 then generates a plurality of measurement signals, each of which corresponds to one of the swept frequencies. To this end, the sweep receiver 20 operates in the manner discussed above in connection with the measurement circuit of FIG. 1. The measurement signals are representative of the strength of the received signal at each swept frequency. The sweep receiver 20 then compares the measurement signals with the corresponding normalization signals generated in the configuration mode. As discussed above, the receiver controller 28 of the sweep receiver 20 stores the normalization signals during operation in the configuration mode (see FIG. 1). The comparison of the measurement signals with the normalization signals yields a frequency response of the subscriber network. The frequency response comprises a level measurement for each sweep frequency that is representative of the relationship between the normalization signal for that frequency and the measurement signal for that frequency.

If damaged, poor quality, or improperly connected equipment is employed in the subscriber network, then the level for one or more swept frequencies will be below an expected level. To isolate the location of the source of the problem, the sweep transmitter 10 and/or the sweep receiver 20 are then reconnected to other points in the subscriber network, and the sweep test repeated.

As a result the sweep system of the present invention by providing a sweep transmitter that communicates a sweep plan to a sweep receiver in a first connection arrangement prior to connection to the system under test in a second connection arrangement, need not transmit telemetry information including the sweep plan over the system under test or other external network, as was required in the prior art. Moreover, because the sweep plan is communicated between the sweep transmitter 10 and the sweep receiver 20 according to the invention, the sweep plan may be customized and reconfigured from test to test, thereby providing flexibility normally associated with sweep systems that utilize telemetry signals.

Moreover, the sweep receiver 20 of the present invention, by directly connecting to the sweep transmitter 10 to obtain normalization measurements prior to connection to the system under test, provides a degree of measurement accuracy heretofore only achievable with normalization measurements transmitted through a telemetry signal.

Transmission of a telemetry signal requires expensive modulation equipment. Accordingly, the elimination of the need for the telemetry signal by the sweep method and system of the present invention eliminates the cost of the digital data modulation devices that are required to transmit the telemetry data through the system under test.

Figure 3:
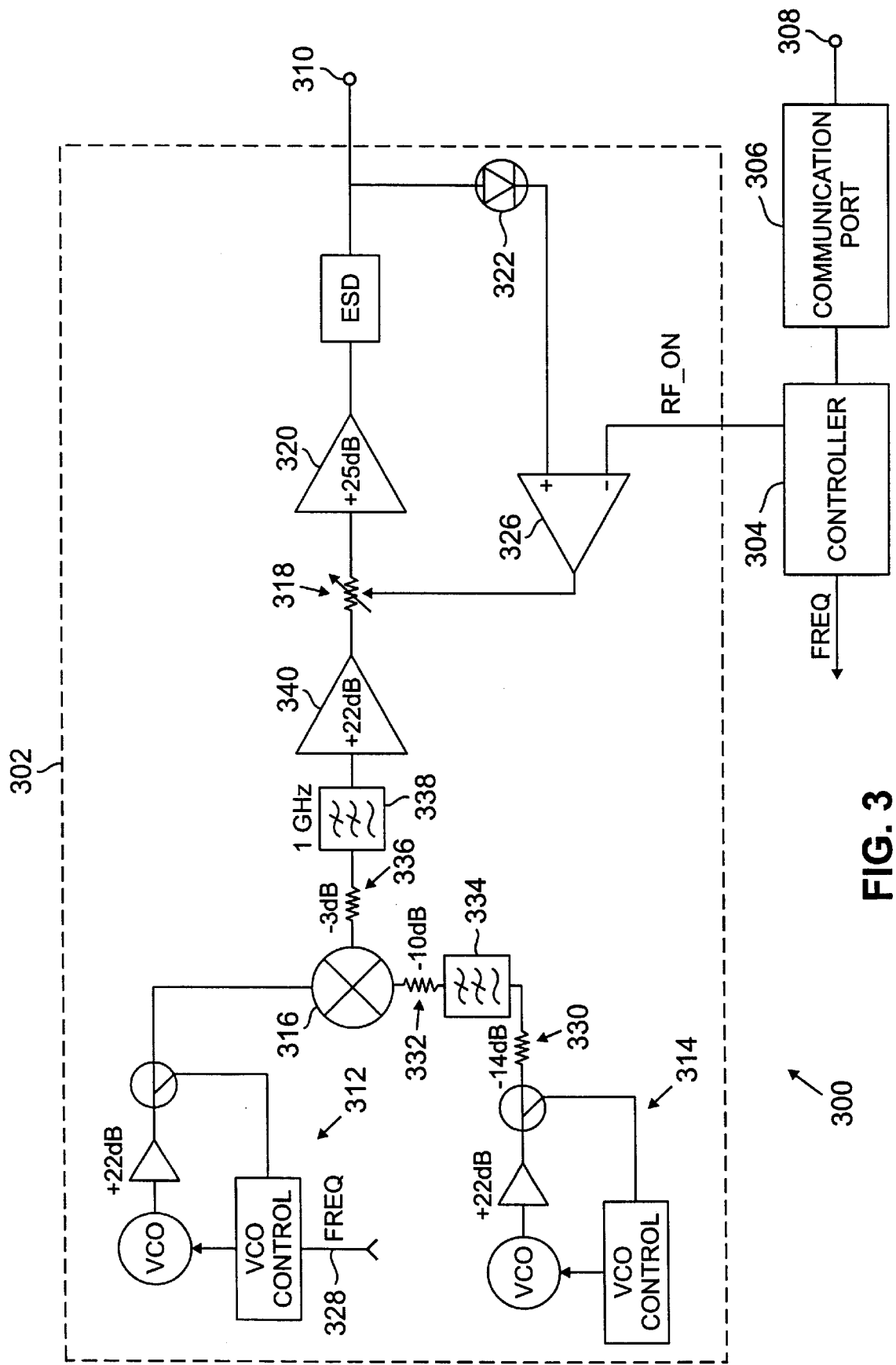
FIG. 3 shows in further detail an exemplary embodiment of a sweep transmitter according to the present invention.

FIG. 3 shows in further detail a sweep transmitter 300 according to the present invention. In general, the sweep transmitter 300 includes an RF transmitter 302, a controller 304, a communication port 306, an auxiliary input 308 and an RF test output 310. The RF transmitter 302 includes a first oscillator circuit 312, a second oscillator circuit 314, a mixer 316, a variable attenuator 318, an output amplifier 320, a feedback detector 322, and a control loop amplifier 326.

The first oscillator circuit 312 is a tunable oscillator circuit operable to provide RF signals over a range of frequencies, for example, from 1655 MHz to 2450 MHz. Specifically, the first oscillator circuit 312 has a control frequency input 328 connected to the controller for receiving sweep control signals therefrom. The first oscillator circuit 312 generates output RF signals having a frequency that corresponds to control signals received at the control frequency input 328. To this end, the first oscillator circuit 312 also includes a voltage controlled oscillator ("VCO") and a VCO control circuit configured in a well-known manner to produce controlled RF signals.

The second oscillator circuit 314 is an oscillator circuit operable to produce an RF signal having a fixed reference frequency. In the embodiment described herein, the second oscillator circuit 314 produce s a reference frequency of 1650 MHz. The second oscillator circuit 14 may suitably have the same structure as the first oscillator circuit 312.

The mixer 316 is operably coupled to receive RF signals from the first oscillator circuit 312 and the second oscillator circuit 314 and to generate a mixed RF signal therefrom. The mixed RF signal, or output signal, may be a synchronization frequency signal, or a portion of a sweep signal. In the exemplary embodiment described herein, the mixer 316 is coupled to the second oscillator circuit 314 through first and second reference signal attenuators 330 and 332, respectively, and a low pass filter 334. The mixer 316 is coupled to provide the output signal to variable attenuator 318 through a first output signal attenuator 336, a one gigahertz low pass filter 338, and a +22 dB amplifier 340.

The variable attenuator 318 is operable to attenuate the output signal in order to provide a level-adjusted output signal to the output amplifier 320. The output amplifier 320 is preferably a +25 dB amplifier, and is further connected to provide an amplified output signal to the RF test output 310 and the feedback detector 322. The feedback detector 322 is operable to receive the amplified output signal and generate a feedback signal having a DC level indicative of the amplified output signal magnitude. The feedback detector 322 is coupled to provide the feedback signal to the control loop amplifier 326. The control loop amplifier 326 is an integrating amplifier circuit comprising an operational amplifier with a capacitive feedback connector. The control loop amplifier 326 is further coupled to the controller to receive a reference signal RF_ON from the controller 304. The control loop amplifier 326 is operable to provide an error signal to the control input of the variable attenuator 318, wherein the error signal is based on the difference between the DC level of RF_ON and the feedback signal.

The communication port 306 is connected between the controller 304 and the auxiliary input. The communication port 306 is a circuit operable to communicate signals, such as those containing information identifying the sweep plan, directly to the communication port of a corresponding sweep receiver. By direct signal communication, it is meant that the communication port 306 does not communicate signals through an intervening network. For example, the communication port 306 may be an RS-232 circuit that communicates to a corresponding RS-232 port through a cable. Preferably, the communication port 306 is operable to effectuate communication at the baseband level, or in other words, without modulating the signals onto a carrier wave.

The controller 304 is a microprocessor circuit or the like that includes memory, not shown, for storing program instructions and data. The controller 304 is operable to control the operations of the sweep transmitter 302 as described herebelow. Those of ordinary skill in the art may devise a suitable controller circuit.

Figure 5:
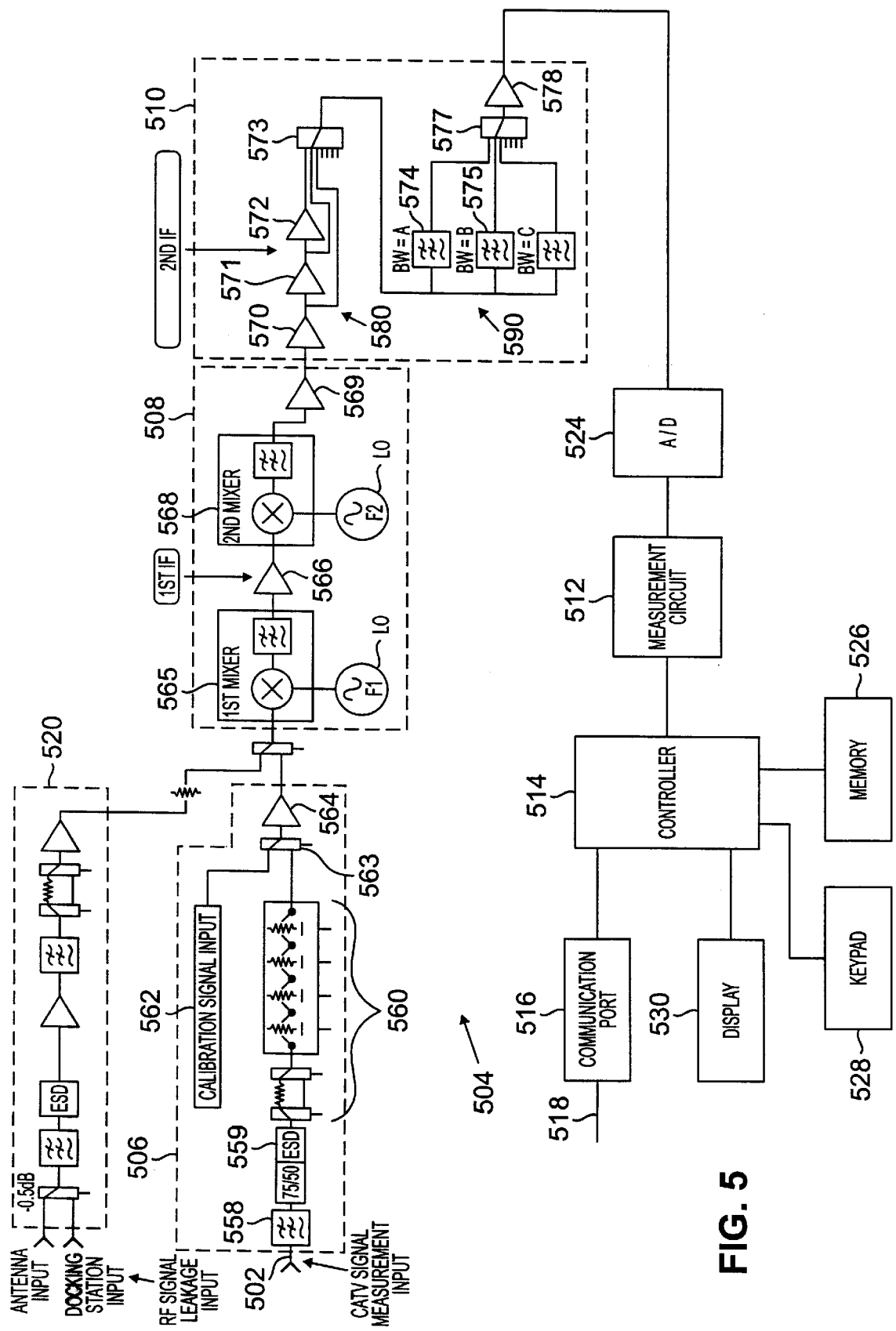
FIG. 5 shows in further detail a schematic block diagram of a sweep receiver according to the present invention incorporated into a combination meter device.

In operation, the sweep transmitter 300 is first connected to a corresponding sweep receiver, such as the sweep receiver of the combination meter 500 of FIG. 5, in a first connection arrangement. To this end, the RF test output 310 is connected to the RF test input of the sweep receiver and the auxiliary input 308 is directly connected to a corresponding input of the sweep receiver. If the sweep receiver is the sweep receiver of the combination meter 500 of FIG. 5, then the auxiliary input 308 is connected to the auxiliary input 518 of FIG. 5, and the RF test output 310 is connected to the RF input 502 of FIG. 5.

The communication input 306 then effectuates communication of the sweep plan with the corresponding communication input of the sweep receiver. In the exemplary embodiment described herein, the communication input 306 receives the sweep plan information from the sweep receiver. The sweep plan information is then provided to the controller 304, which stores the sweep plan in the memory within or associated with the controller 304.

In the embodiment described herein, the sweep plan is defined by a start frequency FSTART, a stop frequency FSTOP, and a resolution RES. FSTART and FSTOP define the lower and upper frequency limits of the sweep, while RES defines the number of frequency points swept between FSTART and FSTOP. For example, if FSTART is equal to 5 MHz, FSTOP is equal to 600 MHz, and RES is equal to 129, then the sweep plan is intended to take measurements at 5 MHz, 9.65 MHz, 14.3 MHz, 18.95 MHz, and so forth, up to and including 600.2 MHz. The user defines FSTART, FSTOP, and RES through input to the sweep receiver.

Alternatively, instead of receiving the sweep plan from the sweep receiver, the communication input 306 may provide the sweep plan to the sweep receiver via the auxiliary input 308. In such an embodiment, the sweep transmitter 300 would preferably include a keypad or other input means to allow the user to define the sweep plan. The controller 304 would then store the user-defined sweep plan. When the sweep transmitter 300 is connected for operation in the configuration mode, then the controller 304 would provide the sweep plan to the communication input 306, which in turn would provide the sweep plan to the sweep receiver through the auxiliary input 308.

In any event, once the sweep plan is communicated to or from the corresponding sweep receiver, the controller 304 commences the sweep operation. In the sweep operation, as discussed further below in connection with FIG. 4, the controller 304 causes the sweep transmitter 300 to transmit both synchronization signals and sweep signals.

To this end, the controller 304 provides a synchronization frequency control signal to the frequency control input 328 that causes the first oscillator to generate an RF signal having a frequency that corresponds to the synchronization frequency.

The after a predetermined time delay, the controller 304 provides the sweep control signal to the frequency control input 328. The sweep control signal is a signal that causes the first oscillator circuit 312 to produce an RF signal having a swept frequency within some predefined range between 1655 MHz and 2450 MHz. In particular, the sweep control signal causes the first oscillator circuit 312 to generate an RF signal between FSTOP+1650 MHz and FSTART+1650 MHz in increments of INCREMENT, which is set equal to (FSTOP−PSTART)/(RES−1). The swept RF signal is provided to the mixer 316.

The second oscillator circuit 314, meanwhile, generates a fixed reference frequency RF signal having a frequency of 1650 MHz. The fixed reference frequency signal is also provided to the mixer 316 through the attenuators 330 and 332 and the low pass filter 334.

The mixer 316 receives the RF signals from each of the first and second oscillator circuits 312 and 314, respectively, and generates either a synchronization output signal, or a sweep output signal, therefrom. The synchronization output signal is an RF signal having a frequency at the synchronization frequency. The sweep output signal is an RF signal having a frequency that is swept in accordance with the sweep plan, in other words, from FSTART to FSTOP in increments of INCREMENT. In either event the mixer 316 provides the resulting output signal to the variable attenuator 318. The variable attenuator 318 provides attenuation to the output signal at a level that corresponds to the DC voltage appearing at its control input.

As will be discussed further below, the DC voltage appearing at the control input of the variable attenuator 318 provides level control to the output sweep signal. In addition, the synchronization pulse sequence of the synchronization signal, which is discussed further below, is generated through provision of a pulse signal at the control input of the variable attenuator 318.

In any event, the variable attenuator provides the level-adjusted output signal to output amplifier 320. The amplifier 320 provides +25 dB of amplification to the output signal to produce a relatively high power output signal. The high power sweep output signal propagates to the RF output 310, and is furthermore detected by the feedback detector 322. The output signal appearing at the RF test output 310 may then propagate to the sweep receiver through the system under test.

The feedback detector 322 and the control loop amplifier 326 operate as a feedback path used to provide a high degree of control over the level of the output signal. To this end, the feedback detector 322 generates a feedback signal having a DC level proportional to the amplitude or power of the output signal. The control loop amplifier 326 receives the feedback signal from the feedback detector 322, and furthermore receives a reference level signal RF_ON from the controller 304. The control loop amplifier 326 compares the feedback signal to the RF_ON sional level and generates an error signal therefrom. The control loop amplifier 326 provides the error signal to the control input of the variable attenuator 318. During ordinary sweep operation, the error signal constitutes a measure of the drift of the magnitude of the sweep output signal from the desired output level.

In particular, the desired output level in the embodiment described herein is 30 dB. The magnitude of the sweep output signal tends to drift due to, among other things, the frequency response of the various components of the RF transmitter 302. In other words, as the sweep signal frequency is swept, the various amplifiers may provide slightly varying levels of amplification and the various attenuators may provide slightly varying levels of attenuation. The feedback control loop provided by the feedback detector 322, the control loop amplifier 326 and the variable attenuator 318 ensures that a constant output level is maintained throughout the swept frequencies of the output sweep signal. It is noted that the feedback control loop may further contain temperature calibration control circuitry, the implementation of which would be known to those of ordinary skill in the art.

The sweep transmitter 300 generates the output signals as described above, which are either sweep signals or synchronization signals, repeatedly until a suitable interrupt signal is provided from a user input or the like, not shown. In particular, the sweep transmitter 300 transmits a synchronization signal followed by a sweep signal after a predetermined time delay, and repeats the sequence continuously in a free run manner.

While connected for operation in the configuration mode, the synchronization signal and sweep signal are provided through a short length of cable to the sweep receiver to facilitate normalization measurements. Once the normalization measurements have been completed, the sweep transmitter 300 may be disconnected from the corresponding sweep receiver and connected to a system under test, such as a subscriber network. Regardless of the disconnection and reconnection, the sweep transmitter 300 continues to provide the synchronization signal and sweep signal sequence. After connection to the system under test, the synchronization signal and sweep signal sequence may then be used for the sweep measurement.

Figure 4:
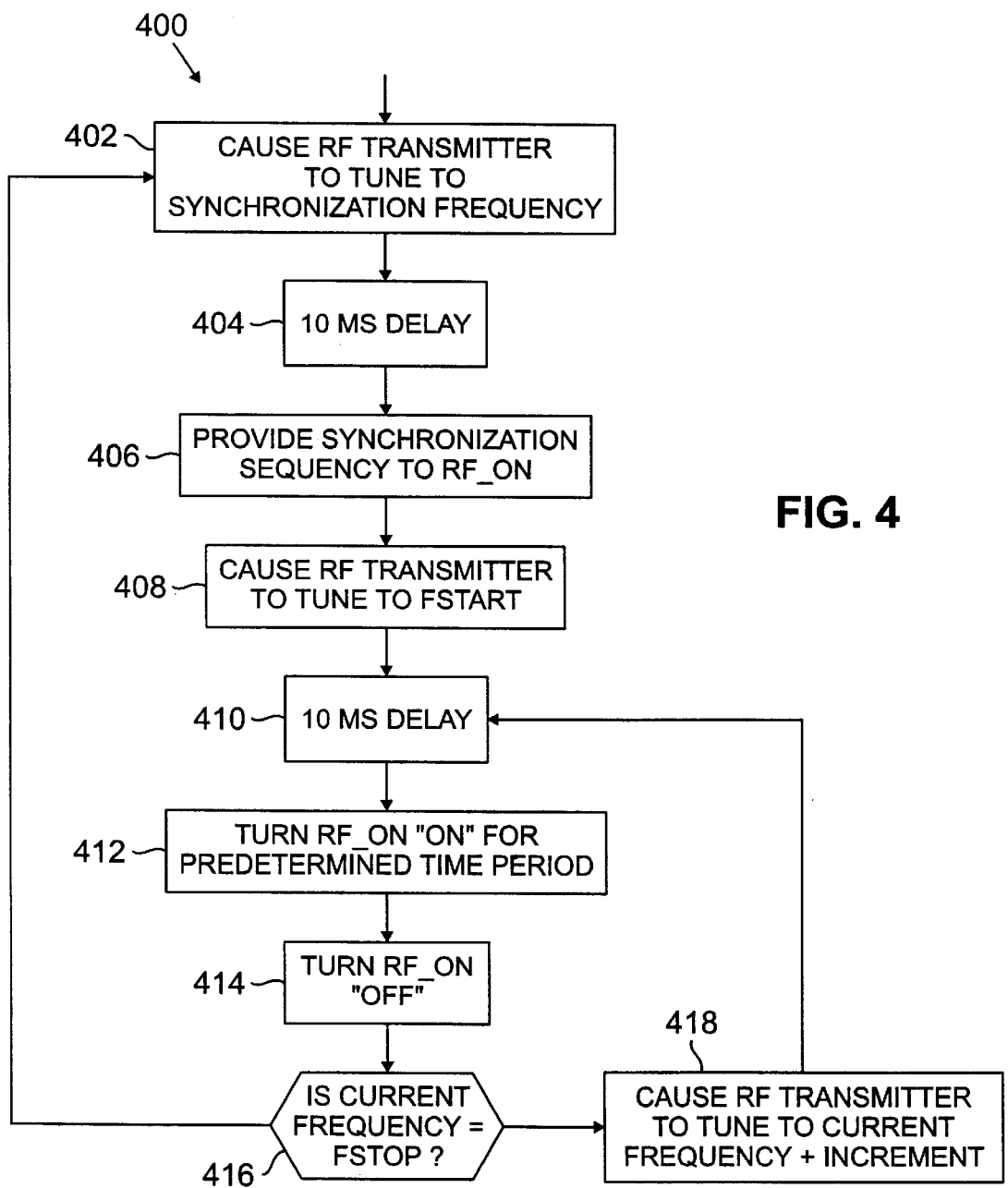
FIG. 4 shows the detailed operation of the controller of the sweep transmitter of FIG. 3 in connection with the generation of sweep signals and synchronization signals.

FIG. 4 shows the detailed operation of the controller 304 in connection with the generation of sweep signals and synchronization signals. In general, the controller 304 provides control signals to the various elements of the sweep transmitter 300 to cause the sweep transmitter 300 to generate sweep output signals and a synchronization control signal. The description of the flow diagram 400 of FIG. 4 will be done with reference to the circuit elements of FIG. 3.

In step 402, the controller 304 causes the sweep transmitter to tune to a preselected synchronization frequency. In the embodiment described herein, the synchronization frequency is equal to (FSTART+FSTOP)/2, or the middle frequency of the defined sweep range. To this end, the controller 304 causes the first oscillator circuit 312 to tune to [(FSTART+FSTOP)/2]+1650. During step 402, however, the controller 304 provides a DC level in the $RF_{13}$ ON signal that causes the variable attenuator 318 to effectively eliminate any output power, or in other words, "turn off" the RF output signal. After a ten millisecond delay in step 404, the controller 304 then, in step 406, generates a pulse sequence in the RF_ON signal that causes the variable attenuator 318 to turn the RF output signal on and off responsive to the pulse sequence. The pulse sequence is provided to the control loop amplifier 326.

Figure 4A:
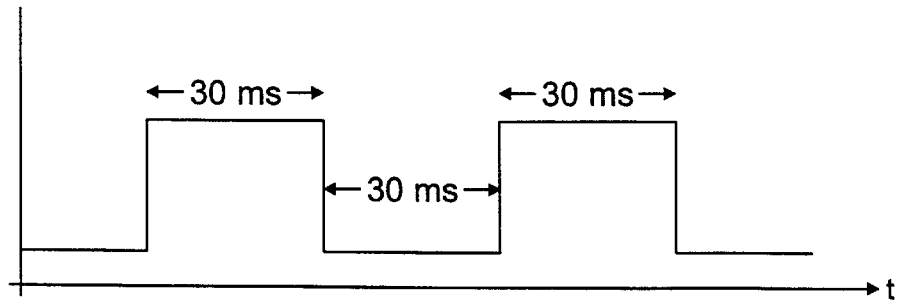

More specifically, the pulse sequence is shown in FIG. 4a, and consists of two square wave pulses, each thirty milliseconds in length, separated by thirty milliseconds. The pulse sequence in the RF_ON signal causes the sweep transmitter 300 to transmit two pulses of an RF output signal at the synchronization frequency. The resulting pulsed RF output signal constitutes the synchronization signal.

Referring again to FIGS. 3 and 4, once the synchronization signal is transmitted, the controller 304 executes step 408. Steps 408 through 418 effectively describe the generation of the sweep control signal by the controller 304. In step 408, the controller 304 provides a first part of the sweep control signal in which a DC level corresponding to FSTART+1650 is provided to the first oscillator circuit 312. After a ten millisecond delay in step 410, the controller 304 in step 412 provides a DC level corresponding to the appropriate sweep output signal amplitude in the RF_ON signal, thereby causing transmission of a portion of the sweep output signal from the RF test output 310 for a predetermined duration. The controller 304 then, in step 414, "turns off" RF_ON, thereby effectively stopping transmission of the sweep output signal.

The predetermined duration in which the RF_ON signal remains "on" is at least the amount of time that is needed by the corresponding sweep receiver to carry out accurate level measurements. In the embodiment described herein, which is intended for use in connection with the sweep receiver 500 of FIG. 5, the predetermined duration is twenty-five milliseconds if the frequency of the current portion of the sweep output signal is less than or equal to 12 MHz, and nineteen milliseconds if the frequency of the current portion of the sweep output signal is greater than 12 MHz.

In step 416, the controller 304 determines whether the frequency sweep is complete, or in other words, if the frequency of the current portion of the sweep output signal is equal to FSTOP. If so, the controller 304 returns to step 402 and repeats the process of the flow diagram 400.

If not, however, then the controller proceeds to step 418. In step 418, the controller 304 causes the RF transmitter 302 to increase the frequency of the current portion of the sweep output signal by an increment of INCREMENT. To this end, the DC level of the sweep control signal is incremented by a proportion that corresponds to a frequency increase of INCREMENT. Once the DC level of the sweep control signal is adjusted appropriately, the controller proceeds to step 410 and proceeds from there as described above.

Accordingly, the controller 304 runs a continuous cycle of generating a synchronization signal and generating a sweep control signal. Steps 402 through 406 generate the synchronization signal while the execution of steps 408 through 418 generate the sweep control signal.

FIG. 5 shows in further detail a schematic block diagram of a sweep receiver according to the present invention. In the exemplary embodiment of FIG. 5, the sweep receiver is incorporated into a device referred to herein as a combination meter 500. A combination meter 500 is an RF test device that has several uses, including CATV leakage detection and CATV sweep testing. For the purposes of clarity of exposition, only those details which pertain to the sweep testing functionality of the combination meter 500 will be described herebelow.

For sweep testing, the combination meter 500 of FIG. 5 is intended for use as a sweep receiver, such as the sweep receiver 20 of FIG. 1, discussed above. In particular, the combination meter 500 represents an exemplary embodiment of the sweep receiver 20 of FIG. 1. In the embodiment described herein, the combination meter 500 is configured for use in connection with the sweep transmitter 300 of FIG. 3 to carry out the sweep testing methods of the present invention.

In particular, FIG. 5 shows a combination meter 500 which includes an RF test input 502, an RF receiver circuit 504 comprising a conditioning stage 506, a frequency conversion stage 508 and an amplification stage 510, a measurement circuit 512, a controller 514, a communication port 516 and an auxiliary input 518 similar to those described above in connection with the sweep receiver 20 of FIG. 1. The combination meter 500 further includes a second RF input 520 for use in leakage detection, the discussion of which is beyond the scope of this disclosure.

The combination meter 500 further includes an analog-to-digital ("A/D") converter 524, a memory 526, a keypad 528 and a display 530.

The conditioning stage 506 comprises input stage circuitry that is operable to receive, and provide initial conditioning to, an RF signal received through the RF test input 502. The RF signal may suitably be a synchronization signal or a sweep signal as defined above in connection with FIGS. 3 and 4. As discussed above, the sweep signal is an RF signal having a frequency swept in accordance with a sweep plan. To this end, the RF signal comprises a plurality of temporally-spaced RF signal segments, each segment having a frequency equal to one of the swept frequencies. Thus, a sweep signal having a sweep range of 5 MHz to 600.2 MHz with a sweep resolution of 129 comprises a first temporal segment having a frequency of 5 MHz, a second temporal segment having a frequency of segment of 9.65 MHz, a third temporal segment having a frequency of 14.3 MHz, and so forth, with the last temporal segment having a frequency of 600.2 MHz.

In general, the conditioning stage 506 is operable to receive any such RF signals in a frequency range between 5 MHz and 890 MHz. Such a frequency range corresponds to the spectrum currently used for CATV transmissions. Those of ordinary skill in the art may readily modify the conditioning stage to receive RF signals having other frequency ranges. In any event, the conditioning stage 506 is configured to provide initial conditioning to the input signals by providing amplification, filtering, and impedance matching if necessary.

To this end, the conditioning circuit 506 includes a bandpass filter 558, an impedance matching circuit 559, a variable attenuator 560, a calibration signal input 562, a calibration signal switch 563, and an amplifier 564. The bandpass filter 558, the impedance matching circuit 559, and the variable attenuator 560 are serially connected. The bandpass filter 558 is further connected to the RF test input 502.

The bandpass filter 558 is an RF filter that has a pass band consisting of the entire CATV spectrum, which currently 5 MHz to 890 MHz. The impedance matching circuit 559 may suitably be any known transformer that converts the characteristic impedance of the RF circuit from 50 ohms to 75 ohms. The impedance matching circuit 559 also preferably includes an electrostatic discharge protection circuit ("ESD"). Such circuits are well known. The variable attenuator 560 includes a plurality of switchable impedance stages controlled by the controller 514. The controller 514 adjusts the attenuation provided by the variable attenuator 560 to scale, or level-adjust, the received RF signals for the purposes of measurement. For example, if an input RF signal is very strong, the controller 514 may cause the variable attenuator 560 to increase the attenuation to reduce the amplitude of the signal to scale the signal into the preferred levels for carrying out either synchronization sequence detection or sweep signal measurement. Likewise, if the input signal is weak, the controller 514 may cause the variable attenuator 560 to reduce the attenuation to increase the amplitude of the signal. The controller 514 adjusts the impedance by selectively activating the various impedance stages. In the exemplary embodiments, the variable impedance circuit includes independently actuatable stages of 23 dB, 16 dB, 8 dB, 4 dB, and 2 dB of attenuation, respectively.

The calibration signal input 562 is operable to be connected to a source of calibration signals. The calibration signals are employed to allow the controller 514 to calibrate the circuit as necessary to compensate for the effects of temperature variation on the RF circuit devices within the RF circuit 504. The calibration signal switch 563 is an electronically controlled switch that alternatively connects the variable attenuator 560, and the calibration signal input 562 to the amplifier 564. The amplifier 564 is an RF amplifier that provides approximately 13 dB of gain. The amplifier 564 is thereafter connected to the coupling device 522. The second RF input 520 is also connected to the coupling device 522.

The coupling device 522 may suitably be any device or circuitry that connects both the conditioning stage 506 to the frequency conversion circuit 508 and the second RF input 520 to the frequency conversion circuit 508 while providing isolation between the conditioning stage 506 and the second RF input 520. The coupling device 522 may, for example, be a diode switch, a GaAs FET switch, or a hybrid directional RF coupler. The coupling device 522 preferably includes a control input for receiving control signals that cause the coupling device 522 to connect a select one of the conditioning stage 506 and the second RF input 520 to the frequency conversion circuit 508.

The frequency conversion circuit 508 includes one or more frequency conversion stages that are operable to receive RF signals in a first frequency range and convert those RF signals into signals of a second frequency range. The first frequency range includes the frequency range of all possible sweep frequencies. Thus, in the CATV testing implementation discussed herein, the first frequency range would be between 5 MHz and 890 MHz. The second frequency range should essentially comprise an intermediate frequency ("IF") plus some tolerance range. As a result, according to the exemplary implementation of the invention describe herein, the frequency conversion circuit 508 is operable to receive signals within the first frequency range, from 5 MHz to 890 MHz, and produce signal in a range that is approximate equal to IF +/−0.15 (IF).

Each of the frequency conversion stages of the frequency conversion circuit 508 includes a mixer, a local oscillator ("LO"), and a filter. The LOs of the first and second conversion stages 565 and 568, respectively, are connected to and controlled by the controller 514. The first an second IF amplifiers 566 and 569 are each RF amplifiers that provide approximately 20 dB of gain.

The frequency conversion circuit 508, and more particularly, the second IF amplifier 119, is operably connected to the amplification stage 510 that is configured to provide amplification and conditioning to the IF signal received from the frequency conversion circuit 508. The amplification stage 510 includes amplifiers and filters that provide suitable signal levels that allow the measurement circuit 512 to perform the appropriate signal level measurement and/or leakage signal detection.

The amplification stage 510 includes a variable amplification stage 580 and a variable filter stage 590. The variable amplification stage 580 includes a first, second and third op-amp amplifiers 570, 571, and 572 are serially connected. The first op-amp amplifier 570 provides 20 dB of gain, the second op-amp amplifier 571 provides 6 dB of gain, and the third op-amp amplifier 572 provides 24 dB of gain. The multiplexer has inputs connected to the output of each of the first, second and third op-amp amplifiers 570, 571, and 572, respectively. The multiplexer 573 is operably connected to the controller, and may be controllably operated to connect any on of the multiplexer inputs to the multiplexer output. In this manner, the controller may select the gain provided by the variable amplification stage 580 to be either 20 dB as provided by the first op-amp amplifier 570, 26 dB as provided by the combination of the first and the second op-amp amplifiers 570 and 571, or 50 dB as provided by the combination of all three op-amp amplifiers 570, 571, and 572.

The use of a step adjustable op-amp amplification stage is provided in order to allow the combination meter 500 to provide different levels of gain based upon the meter functionality being utilized. For example, if the combination meter 500 is used for leakage detection, then the variable amplification stage 580 would be set to a first amplification level. If, however, the combination meter 500 is being used for sweep testing, the variable amplification stage 580 would provide a second amplification level. For sweep testing, the variable amplification stage 580 is configured to provide +26 dB of gain.

The variable filter stage 590 includes first and second low pass filters 574 and 575, respectively. The first low pass filter 574 has a cut off frequency at or near the system IF signal frequency. In the exemplary embodiment described herein, the IF signal frequency is approximately 75 kHz. As a result, the first low pass filter will have a cut off frequency of just above 75 kHz, such as for example, 95 kHz.

The second low pass filter 575 has a cut off frequency that is substantially higher which is employed for other functions of the combination meter 500.

It is to be noted that the use of a relatively low IF signal frequency of 75 kHz allows for the use of relatively inexpensive filter and amplifier components in the amplification stage 510. The use of relatively low IF signal frequency further allows for a lower sampling rate A/D converter 524, which reduces cost. If, however, an analog measurement circuit is used, the IF frequency may suitably be of much higher frequencies, such as on the order of 10 MHz.

The first and second low pass filters 574 and 575 are thereafter connected through a switch 577 to the RF circuit output 578. The RF circuit output 578 is then connected to the measurement circuit 512 through the ("A/D") converter 524.

As a consequence, the RF circuit 504 as described above is generally operable to receive either sweep signals or synchronization signals from the RF test input 502 and provide an output signal therefrom, the output signal comprising a conditioned IF signal for suitable synchronization sequence detection or sweep signal measurements. The A/D converter 524 is a circuit operable to receive the conditioned IF signal and produce a digital IF signal therefrom.

The measurement circuit 512 is a circuit that is operable to receive digital IF signals and generate measurements of the level of the received signals. According to the present embodiment, the measurement circuit 512 includes a digital signal processing circuit 512a that performs the measurement circuit functions. To this end the measurement circuit 512 includes a digital signal processing device or circuit programmed and/or configured to perform the operation discussed further below in connection with the general description of the operation of the device. The digital signal processing ("DSP") circuit 512a may be a 16 bit DSP device, a combination of a field programmable gate array and a microprocessor, or discrete digital components. In the exemplary embodiment described herein, the digital signal processing circuit 512a functionality is carried out by a field programmable gate array and the microprocessor that also serves as the controller 514.

In any event, the controller 514 is operably connected to control the operations of the measurement circuit 512, the conditioning stage 506, the second RF input 24, the coupling device 522, the frequency conversion circuit 508, and the amplification stage 510. The controller 514 may suitably be a microprocessor. The controller 514 is further connected to the keypad 528 and the display 530. The keypad 528 provides a means for accepting user input and the display 530 provides a means for communicating results to a user. Results may alternatively be communicated by an audible signal, include those generated using speech synthesis. Alternatively, results may be provided to through the communication port 518, to facilitate the transfer of the results information to a remote device, not shown.

The operation of the combination meter 500 to perform sweep testing according to the present invention is discussed in connection with the flow diagram of FIG. 6. In general, the combination meter 500 receives RF signals representative of synchronization signals or sweep signals and processes the signals to perform a sweep test that is synchronized with the operation of the sweep transmitter 300 of FIG. 3. In addition, the combination meter 500 is operable to communicate test parameters, for example, a sweep plan, through a direct digital communication link with the sweep transmitter 300.

The RF receiver 504 and the measurement circuit 512 operate in the following manner to obtain measurement signals in accordance with the present invention.

Initially, the conditioning stage 506 first receives and conditions an RF input signal which may be a sweep signal comprising a plurality of temporal segments, or a synchronization signal. The conditioning stage 506 conditions the RF signal and then provides the RF signal to the frequency conversion circuit 508. The frequency conversion circuit 508 performs a frequency conversion on the RF signal to generate an intermediate frequency signal of a predetermined frequency. To this end, the controller provides an appropriate control signal to the frequency conversion circuit 508 to cause the frequency conversion circuit 508 to convert the frequency of the RF signal to the predetermined intermediate frequency ("IF"). In the case of synchronization signals the controller 514 cause the frequency conversion circuit 508 to convert the RF signal to convert from the synchronization frequency to the IF. In the case of sweep signals, the controller 514 provides the sweep control signal, which causes the frequency conversion circuit 508 to convert each of the temporal segments of the sweep signal into the IF.

The IF signal is then provided to the signal conditioner 506 which filters the IF signal, leaving predominantly just the IF signal frequency component. The resultant filtered IF signal essentially comprises a down-converted version of either the synchronization signal or the plurality of temporal segments of the sweep signal.

In the exemplary embodiment described herein, the filtered IF signal is then sampled by the A/D converter 524 to produce a digital IF signal. The A/D converter 524 provides the digital IF signal to the measurement circuit 512, which generates signal level information regarding the digital IF signal and provides the signal level information to the controller.

In particular, the measurement circuit 512 uses digital signal processing techniques to obtain a level measurement of the received digital IF signal. To this end, the measurement circuit 512 may suitably obtain one or more peak values of the digital IF signal for a number of temporal windows having a predetermined window size. The window is chosen such that it exceeds the period of the IF signal, to ensure that the IF signal frequency component is removed from the measurement. The one or more peak values may then be averaged to obtain the level of the digital IF signal. Preferably, the measurement circuit 512 generates average peak value information on an ongoing basis, such that the level of the received RF signal is measured on an ongoing basis. The measurement circuit 512 then provides each average peak value, which constitutes the measurement signal, to the controller 514.

The controller 514 processes a plurality of measurement signals to either obtain the signal level as a function of frequency for sweep measurements, or to detect a synchronization pulse sequence. The controller 514 takes into account any scaling or gain adjustment performed by the RF receiver 504 when determining the signal level measurements. In the case of sweep measurements, the signal level as a function of frequency may be stored in the memory 526 in the case of normalization measurements, or compared with the normalization measurements and provided to the display 530 in the case of actual sweep test measurements.

Figure 6:
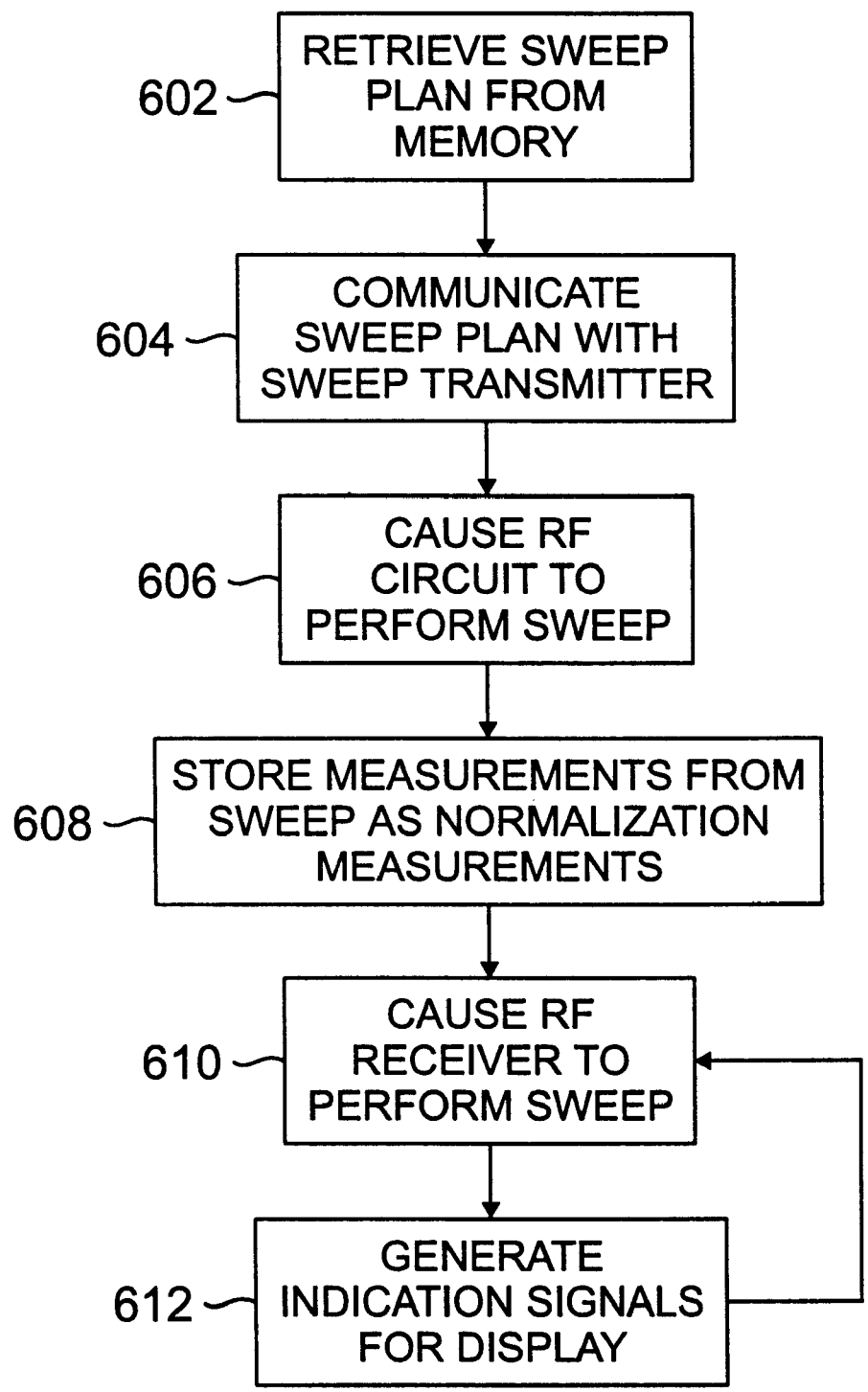
FIG. 6 shows a flow diagram of the operations carried out by the controller of the combination meter of FIG. 5 in a sweep testing method according to the present invention.

FIG. 6 shows a flow diagram 600 of the operations carried out by the controller 514 in the combination meter 500 of FIG. 5 in a sweep testing method according to the present invention. At the beginning of the flow diagram 600, the RF test input 502 is connected to a corresponding RF test output of a suitable sweep transmitter, such as the sweep transmitter 300 of FIG. 3. In addition the auxiliary input 518 is also directly connected to a corresponding auxiliary input of the sweep transmitter.

In step 602, the controller 514 receives the sweep channel plan from the memory 526, which may suitably have been previously entered via the keypad 528. In any event, the controller 514 thereafter, in step 604, provides the sweep plan information to the communication port 516, which then effectuates communication of the sweep plan information with the communication port of the corresponding sweep transmitter.

After step 604 the controller 514 executes step 606. In step 606, the controller 514 provides a sweep control signal in accordance with the sweep plan to the RF receiver 504. Further detail regarding the operation of the controller 514 to provide a sweep control signal is discussed further below in connection with FIG. 7.

In any event, in step 608, the controller 514 obtains measurement signals pertaining to the received sweep signal and stores the measurement information in the memory 526. The stored measurement information constitutes the normalization measurement information.

Once the normalization measurement information is stored in step 608, the controller executes step 610. In step 610, the controller 514 provides another sweep control signal to the RF receiver 504. In step 612, the controller 514 receives subsequent measurement signals which correspond to the signal level of the sweep signal at each of the swept frequencies. The controller 514 compares the measurement information within those measurement signals to the normalization measurement information stored in the memory 526. Again, the details of the operation of the controller 514 to perform the sweep operation are described below in connection with FIG. 7.

In step 612, the controller provides indication signals to the display 530 based on the comparison of the measurement information with the normalization measurement information. Each indication signal corresponds to one of the plurality of swept frequencies.

The controller then returns to step 612 and generates another sweep control signal and proceeds accordingly. The controller repeats steps 610 and 612 until an interrupts is received from the keypad 528, representative of a user command to stop the sweep test.

It is assumed that at some point after step 608 is executed, the user will disconnect the RF test input 502 from the RF test output of the sweep transmitter and also disconnected the auxiliary input 518 from the corresponding auxiliary input of the sweep transmitter. While disconnected, the controller 514 continues to execute steps 610 and 612, which would temporarily provide an error signal on the display 530. The user would then presumably connect the combination meter 500 and the sweep transmitter in the second connection arrangement. To this end, the RF test input 502 is connected to a first end of a system to be tested and the sweep transmitter is connected to a second end of a system to be tested, such as is illustrated in FIG. 2. Once the combination meter 500 of FIG. 5 and the corresponding sweep transmitter are connected to the system to be tested, the execution of step 610 and 612 will cause the display 530 to display measurements as a function of frequency that represent a frequency response of the system under test.

Figure 7:
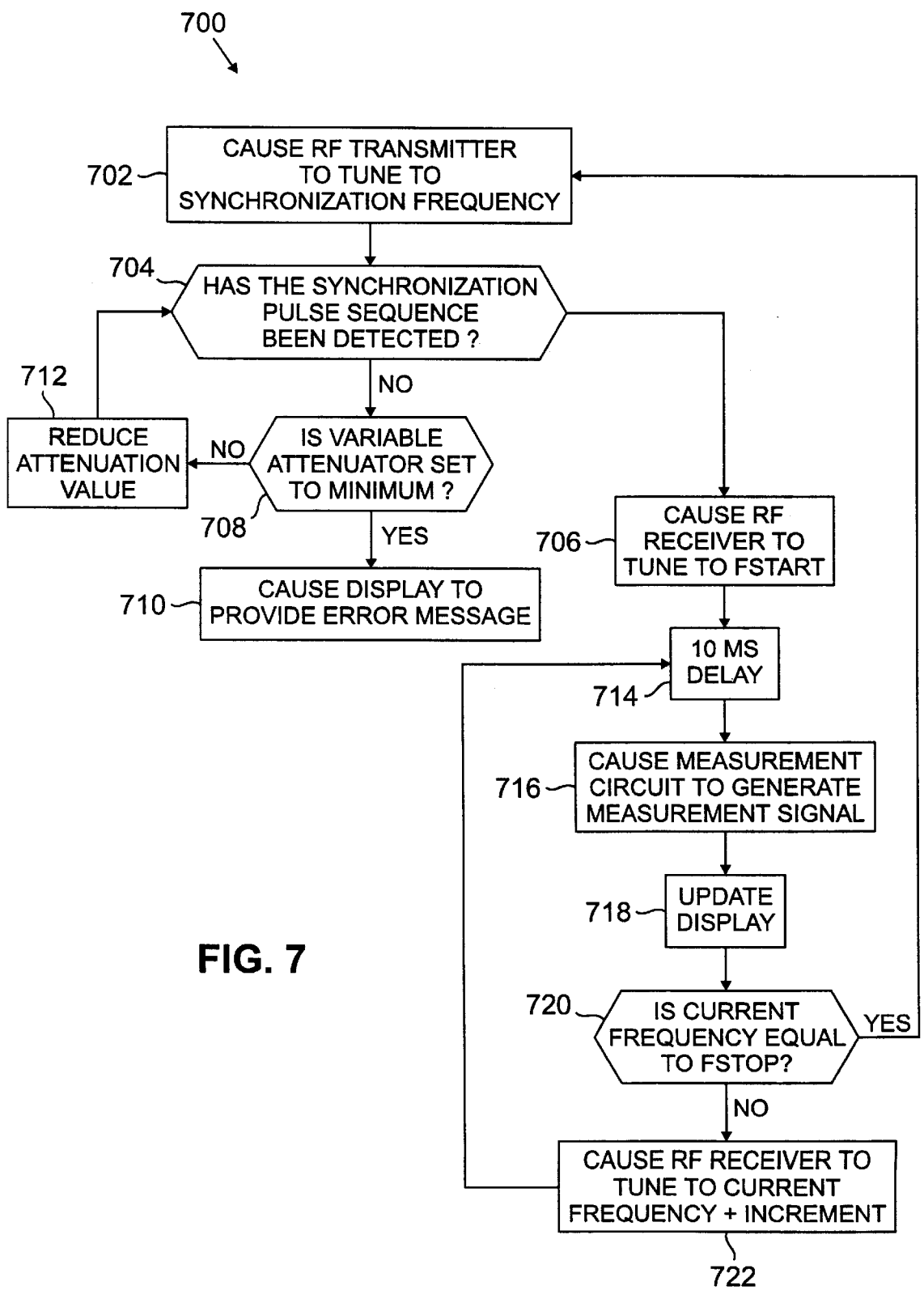
FIG. 7 shows the detailed operation of the controller of the combination meter of FIG. 5 in connection with the control of the sweep receiver to detect the synchronization signal and the sweep signal generated by the sweep transmitter of FIG. 3.

FIG. 7 shows the detailed operation of the controller 514 in connection with the control of the sweep receiver to detect the synchronization signal and the sweep signal generated by the sweep transmitter of FIG. 3. Although the flow diagram 700 of FIG. 7 is described with reference to the circuit elements of FIG. 5, it will be noted that those of ordinary skill in the art may readily devise alternative sweep receiver circuits capable of carrying out the operations of the flow diagram 700.

In step 702, the controller 514 causes the sweep receiver of the combination meter 500 to tune to a preselected synchronization frequency that corresponds to the synchronization frequency employed by the corresponding sweep transmitter. As described above, in the embodiment described herein, the synchronization frequency is equal to (FSTART+FSTOP)/2, or the middle frequency of the sweep range. To this end, the controller 514 provides appropriate control signals to the frequency conversion circuit 508 to tune to (FSTART+FSTOP)/2.

Then in step 704, the controller 514 determines whether a synchronization pulse sequence is detected within the time it would normally take a sweep to occur. In particular, the measurement signal 512, operating as described above in connection with FIG. 5, provides periodic measurement signals indicative of the level of the received RF signal while tuned to (FSTART+FSTOP)/2. If the controller 514 detects a sequence in which the level of the measurement signal goes high for 30 milliseconds, then low for 30 milliseconds, and then high again for 30 milliseconds, then the controller 514 has detected the synchronization sequence and proceeds to step 706.

It will be noted that in the instant embodiment in which the sweep transmitter operates as discussed above in connection with FIG. 4, the controller 514 should detect the synchronization sequence within a predetermined time period. Specifically, the sweep transmitter 300 of FIG. 3 generates a synchronization sequence between every sweep on an ongoing free run basis. Accordingly, if the combination meter is properly configured to receive the synchronization signal, then the controller 514 should detect the synchronization pulse sequence in the time it would take for a complete sweep to occur.

If, however, in step 704, the controller 514 does not detect the synchronization pulse sequence within the predetermined amount of time, then the controller 514 proceeds to step 708. In step 708, the controller 514 determines whether the attenuation value of the variable attenuator 560 is set to a minimum value. If so, then in step 710, the controller 514 determines that the sweep signal is not being received and may cause the display 530 to provide a suitable error message. If however, the attenuation value of the variable attenuator 560 is not set to a minimum value, then the controller 514 in step 712 provides a control signal that causes the variable attenuator 514 to reduce its attenuation value. After step 712, the controller 514 returns to step 704 to attempt again to detect the synchronization pulse sequence.

If the synchronization pulse sequence is detected in step 704, then the controller 514 proceeds to step 706. In step 706, the controller 514 provides a first part of the sweep control signal to the frequency conversion circuit 508. The first part of the sweep control signal causes the frequency conversion circuit 508 to tune to the frequency FSTART. The controller then awaits a predetermined time delay in step 714. The predetermined time delay corresponds to the predetermined time delay relationship between the synchronization signal and the sweep signal. After the predetermined delay (step 714), the controller 514 in step 716 causes the measurement circuit 512 to generate one or more measurement signals on the received signal.

The one or more signal level measurements provide a measurement of the portion of the sweep signal at a particular frequency. In the embodiment described herein, the measurement circuit 512 performs such measurements for a duration of time that is less than twenty-five milliseconds if the current sweep frequency is less than 12 MHz, and less than nineteen milliseconds if the current sweep frequency is greater than 12 MHz.

In any event, after step 716, the measurement circuit 514 in step 718 updates the display 530. In particular, the controller 514 causes the display 530 to generate a table wherein the horizontal axis shows a frequency index and the vertical axis is a signal level index. In general, there is a signal level indicator for each frequency across the horizontal axis. For each execution of step 716, which causes the generation of a signal level measurement at one of the swept frequencies, the controller 514 in step 718 causes the display 530 to update the signal level indicator corresponding to that frequency.

After step 718, the controller 514 proceeds to execute step 720. In step 720, the controller 514 determines whether the sweep has been completed, or in other words, whether the current sweep frequency is FSTOP. If so, then the controller 514 returns to step 702 to repeat the process described above. If not, however, then the controller 514 executes step 722. In step 722, the controller 514 causes the frequency conversion circuit 508 to tune to the current sweep frequency plus RES. The controller 514 then returns to step 714 to wait for a predetermined delay time before performing another signal level measurement in step 716.

As a result, the controller 514 executes steps 714, 716, 718, 720 and 722 for each discrete frequency identified in the sweep plan. Moreover, after each sweep, the controller 514 returns to detect the synchronization signal and perform a subsequent sweep measurement. In this manner, the display 530 is updated on an ongoing basis.

It will be appreciated that the above described embodiments are merely illustrative, and that those of ordinary skill in the art may readily devise their own implementations that incorporate the features of the present invention and fall within the spirit and scope thereof.

We claim:

1. An apparatus for receiving sweep testing signals and generating frequency response values therefrom, the sweep testing signals generated in accordance with a predefined sweep plan by a remote sweep transmitter, the sweep transmitter coupled to a communication system to be tested, the apparatus including:
   a) a test input for connecting to a terminal of the communication system to be tested, the test input comprising an RF input;
   b) a controller operable to
      effect communication of the sweep plan with the sweep transmitter prior to connection of the test input to the terminal,
      generate a sweep control signal, the sweep control signal responsive to the sweep plan;
   c) a receiver circuit operably coupled to the test input for receiving sweep testing signals therefrom, the receiver circuit having a control input connected to receive the sweep control signal from the controller, the receiver circuit operable to tune to a plurality of frequencies responsive to the sweep control signal;
   d) a measurement circuit coupled to the receiver circuit and operable to generate measurement signal values corresponding to the plurality of frequencies, said measurement signal values comprising said frequency response values.

2. The apparatus of claim 1 further comprising a communication input operable to effect communication of the sweep plan between the controller and the sweep transmitter.

3. The apparatus of claim 2 wherein the communication input comprises a digital serial communication input.

4. The apparatus of claim 1 further comprising a memory coupled to the controller, and wherein the controller is further operable to
   obtain the sweep plan from the memory, and
   effect communication of the sweep plan to the sweep transmitter.

5. The apparatus of claim 1 further comprising a memory coupled to the controller, and wherein the controller is further operable to
   effect communication of the sweep plan from the sweep transmitter communication input, and
   provide the sweep plan to the memory.

6. The apparatus of claim 1 further comprising a display, and wherein the controller is further operable to
   receive the measurement signals from the measurement circuit,
   generate indication signals representative of the measurement signals, and
   provide the indication signals to the display.

7. The apparatus of claim 1 wherein the receiver circuit is further operable to
   receive an RF sweep signal from the test input, the RF sweep signal corresponding to the sweep plan, and
   generate an intermediate frequency signal comprising a plurality temporal segments, each segment corresponding to one of the plurality of frequencies, and and wherein the measurement circuit is further operable to generate a measurement signal for each segment.

8. The apparatus of claim 7 further comprising an analog-to-digital (A/D) converter coupled between the receiver circuit and the measurement circuit, and wherein the measurement circuit includes a digital signal processing circuit.

9. The apparatus of claim 1 wherein the receiver circuit is operable to receive a synchronization signal, wherein the measurement circuit is operable to provide a measurement signal based on the synchronization signal to the controller, and wherein the controller is operable to generate the sweep signal after a predetermined delay from receiving the measurement signal based on the synchronization signal.

10. The apparatus of claim 1 wherein the measurement circuit is further operable to identify the synchronization signal from the measurement signal based on the synchronization signal and wherein the synchronization signal comprises a predetermined number of pulses modulated onto a carrier signal having one of the plurality of frequencies.

11. The apparatus of claim 1 further comprising a user input operably connected to the controller, the user input operable to receive input signals representative of a sweep plan, and wherein the sweep plan is based on the received input signals.

12. The apparatus of claim 1 wherein the receiver circuit further comprises a variable attenuator operable connected between the test input and the measurement circuit.

13. The apparatus of claim 1 wherein the receiver circuit further comprises a variable attenuator operable connected between the test input and the measurement circuit.

14. An apparatus for transmitting sweep testing signals for reception by a corresponding sweep testing receiver, the apparatus comprising:
a) a test output for coupling to a communication system to be tested;
b) a controller operable to:
effect communication of a sweep plan with the sweep receiver prior to connection of the sweep receiver to the communication system to be tested
generate a sweep control signal, the sweep control signal responsive to the sweep plan;
c) an RF transmitter having a control input connected to receive the sweep control signal from the controller, the RF transmitter operable to generate a sweep test signal responsive to the sweep control signal, the sweep test signal comprising a plurality of RF test signals, each of the plurality of RE test signals having a distinct carrier frequency.

15. The apparatus of claim 14 further comprising a communication input for effecting communication of the sweep signal with the sweep testing receiver.

16. The apparatus of claim 14 further comprising a memory coupled to the controller, and wherein the controller is further operable to
obtain the sweep plan from the memory, and
effect communication of the sweep plan to the sweep testing receiver.

17. The apparatus of claim 1 further comprising a memory coupled to the controller, and wherein the controller is further operable to
effect communication of the sweep plan from the sweep testing receiver, and
provide the sweep plan to the memory.

18. An apparatus for receiving sweep testing signals and generating frequency response values therefrom, the sweep testing signals generated in accordance with a predefined sweep plan by a remote sweep transmitter, the sweep transmitter coupled to a communication system to be tested, the apparatus including:
a) a test input having a first connection arrangement for connecting to a test output of the sweep transmitter and having a second connection arrangement for connecting to a terminal of the communication system to be tested;
b) a controller operable to generate a sweep control signal the sweep control signal responsive to a sweep plan;
c) a receiver circuit having a control input connected to receive the sweep control signal from the controller, the receiver circuit operable to tune to a plurality of frequencies responsive to the sweep control signal;
d) a measurement circuit coupled to the receiver circuit and operable to generate measurement signals corresponding to the plurality of frequencies;
and wherein the controller is further operable to
receive a first set of measurement signals from the measurement circuit when said test input is connected in the first connection arrangement,
receive a second set of measurement signals from the measurement circuit when said test input is connected in the second connection arrangement,
and generate a frequency response based on the first set of measurement signals and the second set of measurement signals.

19. The apparatus of claim 18 wherein the test input comprises an RF input.

20. The apparatus of claim 18 further comprising a communication input operable to effect communication of the sweep plan between the controller and the sweep transmitter.

21. The apparatus of claim 20 wherein the communication input comprises a digital serial communication input.

22. The apparatus of claim 18 further comprising a memory coupled to the controller, and wherein the controller is further operable to
obtain the sweep plan from the memory, and
effect communication of the sweep plan to the sweep transmitter.

23. The apparatus of claim 18 further comprising a memory coupled to the controller, and wherein the controller is further operable to
effect communication of the sweep plan from the sweep transmitter communication input, and
provide the sweep plan to the memory.

24. The apparatus of claim 18 further comprising a display, and wherein the controller is further operable to
receive the measurement signals from the measurement circuit,
generate indication signals representative of the measurement signals, and
provide the indication signals to the display.

25. The apparatus of claim 18 wherein the receiver circuit is further operable to
receive an RF sweep signal from the test input, the RF sweep signal corresponding to the sweep plan, and
generate an intermediate frequency signal comprising a plurality temporal segments, each segment corresponding to one of the plurality of frequencies, and wherein the measurement circuit is further operable to generate a measurement signal for each segment.

26. The apparatus of claim 25 further comprising an analog-to-digital (A/D) converter coupled between the receiver circuit and the measurement circuit, and wherein the circuit includes a digital signal processing circuit.

27. The apparatus of claim 18 wherein the receiver circuit is operable to receive a synchronization signal, wherein the measurement circuit is operable to provide a measurement signal based on the synchronization signal to the controller, and wherein the controller is operable to generate the sweep signal after a predetermined delay from receiving the measurement signal based on the synchronization signal.

28. The apparatus of claim 18 wherein the measurement circuit is further operable to identify the synchronization signal from the measurement signal based on the synchronization signal and wherein the synchronization signal comprises a predetermined number of pulses modulated onto a carrier signal having one of the plurality of frequencies.

29. The apparatus of claim 18 further comprising a user input operably connected to the controller, the user input operable to receive input signals representative of a sweep plan, and wherein the sweep plan is based on the received input signals.

* * * * *